US011768283B2

(12) United States Patent
 Sleator (10) Patent No.: US 11,768,283 B2
(45) Date of Patent: Sep. 26, 2023

(54) SOUND SOURCE DISTANCE ESTIMATION

(71) Applicant: Waymo LLC, Mountain View, CA (US)

(72) Inventor: Michael Sleator, Woodside, CA (US)

(73) Assignee: Waymo LLC, Mountain View, CA (US)

( * ) Notice: Subject to any disclaimer, the term of this patent is extended or adjusted under 35 U.S.C. 154(b) by 31 days.

(21) Appl. No.: 17/306,327

(22) Filed: May 3, 2021

(65) Prior Publication Data

US 2022/0350006 A1    Nov. 3, 2022

(51) Int. Cl.
 *G01S 11/14* (2006.01)
 *G01S 3/808* (2006.01)

(52) U.S. Cl.
 CPC ............ *G01S 11/14* (2013.01); *G01S 3/8083* (2013.01)

(58) Field of Classification Search
 CPC ............................... G01S 11/14; G01S 3/8083
 See application file for complete search history.

(56) References Cited

U.S. PATENT DOCUMENTS

| 8,798,905 | B2 | 8/2014 | Yoshioka et al. |
| 9,278,689 | B1 | 3/2016 | Delp |
| 9,873,428 | B2 | 1/2018 | Banvait et al. |
| 10,207,638 | B2 | 2/2019 | Herbert |
| 10,319,228 | B2 | 6/2019 | Silver et al. |
| 10,431,082 | B2 | 10/2019 | Yaldo et al. |
| 10,755,691 | B1 | 8/2020 | Herman et al. |
| 10,834,501 | B2 | 11/2020 | Mizuno |
| 2002/0102961 | A1 | 8/2002 | Gibbons et al. |
| 2008/0170717 | A1 | 7/2008 | Liu et al. |
| 2009/0097360 | A1 | 4/2009 | Jeong et al. |
| 2012/0092185 | A1* | 4/2012 | Hayashi ................. B60Q 5/008 340/904 |

(Continued)

FOREIGN PATENT DOCUMENTS

| DE | 102019101128 A1 | 7/2020 |
| EP | 3128497 A1 | 2/2017 |

(Continued)

OTHER PUBLICATIONS

Extended European search report dated Oct. 12, 2022, issued in connection with International Application No. 22170363.0-1206.

(Continued)

*Primary Examiner* — Isam A Alsomiri
*Assistant Examiner* — Abdallah Abulaban
(74) *Attorney, Agent, or Firm* — McDonnell Boehnen Hulbert & Berghoff LLP (57) ABSTRACT

A method of determining a distance between a vehicle and a sound source includes detecting, at a microphone of the vehicle, sounds from a sound source external to the vehicle. The sounds have a first frequency component at a first frequency and a second frequency component at a second frequency. The method also includes determining, at a processor of the vehicle, a classification of the sound source based on audio properties of the sounds. The method further includes determining a first energy level associated with the first frequency component and a second energy level associated with the second frequency component. The method also includes determining a ratio between the first energy level and the second energy level. The method further includes determining the distance between the vehicle and the sound source based on the ratio and the classification of the sound source.

20 Claims, 4 Drawing Sheets

(56) References Cited

U.S. PATENT DOCUMENTS

| | | | |
|---|---|---|---|
| 2015/0117652 A1* | 4/2015 | Sato | G10K 11/002 381/56 |
| 2016/0355125 A1* | 12/2016 | Herbert | G08G 1/0965 |
| 2017/0213459 A1 | 7/2017 | Ogaz | |
| 2018/0211528 A1 | 7/2018 | Seifert | |
| 2018/0261237 A1 | 9/2018 | Moore et al. | |
| 2018/0335503 A1 | 11/2018 | Seifert et al. | |
| 2019/0258251 A1 | 8/2019 | Ditty et al. | |
| 2020/0031337 A1 | 1/2020 | Soltanian et al. | |
| 2020/0238981 A1 | 7/2020 | Seo | |
| 2020/0348687 A1 | 11/2020 | Paudel et al. | |

FOREIGN PATENT DOCUMENTS

| | | | |
|---|---|---|---|
| EP | 3525524 A1 * | 8/2019 | H04W 52/146 |
| FR | 3091383 A1 | 7/2020 | |
| JP | 2005301751 A | 10/2005 | |
| JP | 4725236 B2 | 7/2011 | |
| JP | 6557845 B1 | 8/2019 | |
| KR | 20140148044 A | 12/2014 | |
| WO | 1999031637 A1 | 6/1999 | |
| WO | 2019130789 A1 | 7/2019 | |

OTHER PUBLICATIONS

Akira Nishimura, "Encoding Data by Frequency Modulation of a High-Low Siren Emitted by an Emergency Vehicle", Tenth International Conference on Intelligent Information Hiding and Multimedia Signal Processing, Aug. 27-29, 2014.

Yuki Ebizuka et al., "Detecting approach of emergency vehicles using siren sound processing", IEEE Intelligent Transportation Systems Conference, Oct. 27-30, 2019.

* cited by examiner

SOUND SOURCE DISTANCE ESTIMATION

BACKGROUND

Autonomous vehicles or vehicles operating in an autonomous mode may encounter scenarios in which maneuvers may be quickly undertaken based on unanticipated changes in a surrounding environment. To illustrate, if an emergency vehicle turns on a siren, an autonomous vehicle may responsively steer to the side of the road and stop. Microphones and cameras can be used to estimate a direction of the emergency vehicle with respect to the autonomous vehicle. As a non-limiting example, beamforming can be implemented with microphone arrays to estimate the direction from which the siren sounds are coming. As another non-limiting example, external cameras can capture flashing lights associated with the emergency vehicle, and the autonomous vehicle can determine the direction of the emergency vehicle, with respect to the autonomous vehicle, based on the location of the flashing lights.

While estimating the direction of the emergency vehicle with respect to the autonomous vehicle is useful, it may also be useful to estimate a distance between the autonomous vehicle and the emergency vehicle. In some scenarios, an amplitude of the siren sounds may be used to determine the distance between the autonomous vehicle and the emergency vehicle. For example, detection of relatively loud siren sounds may indicate that the emergency vehicle is relatively close in proximity to the autonomous vehicle, and detection of relatively soft siren sounds may indicate that the emergency vehicle is further away from the autonomous vehicle. However, the amplitude of the siren sounds may be subject to environmental conditions, which can reduce distance estimation reliability.

SUMMARY

The present disclosure generally relates to estimating a distance between a sound source and an autonomous vehicle based on frequency component energy level ratios of detected sounds from the sound source. As a non-limiting example, an emergency vehicle (e.g., the sound source) can output siren sounds that are rich in harmonics. To illustrate, the siren sounds can include a first frequency component at a fundamental frequency, a second frequency component at a second harmonic of the fundamental frequency, a third frequency component at a third harmonic of the fundamental frequency, etc. Energy attenuation rates of the different frequency components may vary based on the corresponding frequencies. For example, the first frequency component may attenuate at a slower rate than the second frequency component, the second frequency component may attenuate at a slower rate than the third frequency component, etc. As a result, as the siren sounds travel further from the emergency vehicle, the energy level ratios between the different frequency components change.

According to the techniques described herein, a microphone of a vehicle can detect the siren sounds, and a processor of the vehicle can determine energy level ratios between the different frequency components (e.g., the different harmonics) of the detected siren sounds. Based on the energy level ratios, the processor may determine (e.g., estimate) the distance between the vehicle and the emergency vehicle (e.g., the sound source).

In a first aspect, a method of determining a distance between a vehicle and a sound source includes detecting, at a microphone of the vehicle, sounds from a sound source external to the vehicle. The sounds have a first frequency component at a first frequency and a second frequency component at a second frequency. The method includes determining, at a processor of the vehicle, a classification of the sound source based on audio properties of the sounds. The method further includes determining a first energy level associated with the first frequency component and a second energy level associated with the second frequency component. The method also includes determining a ratio between the first energy level and the second energy level. The method further includes determining the distance between the vehicle and the sound source based on the ratio and the classification of the sound source.

In a second aspect, a system includes a microphone configured to detect sounds from a sound source external to a vehicle. The sounds have a first frequency component at a first frequency and a second frequency component at a second frequency. The system also includes a processor coupled to the microphone. The processor is configured to determine a classification of the sound source based on audio properties of the sounds. The processor is also configured to determine a first energy level associated with the first frequency component and a second energy level associated with the second frequency component. The processor is further configured to determine a ratio between the first energy level and the second energy level. The processor is also configured to determine a distance between the vehicle and the sound source based on the ratio and the classification of the sound source.

In a third aspect, a non-transitory computer-readable medium stores instructions that are executable by a processor to cause the processor to perform functions. The functions include determining a classification of a sound source external to a vehicle based on audio properties of sounds from the sound source that are detected by a microphone. The sounds have a first frequency component at a first frequency and a second frequency component at a second frequency. The functions also include determining a first energy level associated with the first frequency component and a second energy level associated with the second frequency component. The functions further include determining a ratio between the first energy level and the second energy level. The functions also include determining a distance between the vehicle and the sound source based on the ratio and the classification of the sound source.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure generally relates to estimating a distance between a sound source and a vehicle (e.g., an autonomous vehicle) based on frequency component energy level ratios of detected sounds generated by the sound source. According to the techniques described herein, a vehicle includes at least one microphone that detects sounds from a sound source that is external to the vehicle. As a non-limiting example, the vehicle can include a microphone array that detects siren sounds from an emergency vehicle. The siren sounds output by the emergency vehicle may be rich in harmonics. To illustrate, the siren sounds can include a first frequency component at a first frequency (i.e., a fundamental frequency), a second frequency component at a second frequency (i.e., a harmonic of the fundamental frequency), a third frequency component at a third frequency (i.e., a third harmonic of the fundamental frequency), etc. Although the above example describes the fundamental frequency and harmonics of the fundamental frequency, it should be appreciated that the techniques described herein can be implemented using frequencies that are not harmonically related.

Attenuation rates of the different frequency components may vary based on the corresponding frequencies. In particular, lower frequency components of the siren sounds attenuate at slower rates than higher frequency components of the siren sounds. For example, the first frequency component of the siren sounds may attenuate at a slower rate than the second frequency component of the siren sounds. Similarly, the second frequency component of the siren sounds may attenuate at a slower rate than the third frequency component of the siren sounds. The attenuation of frequency components may be due, at least in part, to atmospheric absorption of acoustic energy, which depends on sound frequencies. As a result, energy level ratios between the frequency components of the siren sounds may fluctuate as the siren sounds attenuate while travelling through air. For example, if the siren sounds travelled one-hundred (100) meters, the ratio between a first energy level associated with the first frequency component and a second energy level associated with the second frequency component may be a first value. However, after the siren sounds travelled two-hundred (200) meters, the ratio between the first energy level and the second energy level may be a second value that is different from the first value. The difference between the ratios may at least in part be based on the mismatch in attenuation rates between the first and second frequency components.

To determine the distance between the vehicle and the sound source (e.g., the emergency vehicle), a processor of the vehicle may determine the first energy level associated with the first frequency component of the siren sounds (as detected by the microphone array) and the second energy level associated with the second frequency component of the siren sounds (as detected by the microphone array). Upon determining the energy levels, the processor may determine the ratio between the first energy level and the second energy level. Based on the ratio, the processor can determine the distance between the vehicle and the sound source.

As a non-limiting example, the processor can access a library that includes an energy level ratio model for the sound source. In particular, the energy level ratio model can indicate modelled energy level ratios for different frequency components of the siren sounds as the siren sounds are emitted from the sound source. The energy level ratio model, and thus the library, can be built and updated according to a machine-learning algorithm such that the modelled energy level ratios reflect sounds emitted from the sound source. Additionally, the processor can also determine atmospheric characteristics associated with the vehicle, such as an ambient air temperature, an atmospheric pressure, a relative humidity, etc. Based on the atmospheric characteristics and the energy level ratio model, the processor can generate attenuation data that indicates how energy level ratios between the different components of the siren sounds change as the siren sounds travel different distances. Based on a comparison of the attenuation data and the ratio (between the first energy level and the second energy level), the processor can determine the distance between the autonomous vehicle and the emergency vehicle.

Thus, in the above example, the distance between the vehicle and the emergency vehicle can be determined based on detected energy level ratios between different harmonics of the siren sounds. In response to determining the distance, the processor can generate commands to maneuver the vehicle. For example, if the processor determines that the emergency vehicle is relatively close in proximity to the vehicle, the processor may generate a command to maneuver the vehicle to the side of the road, a command to stop the autonomous vehicle, etc.

II. Example Embodiments

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple frequency components of a sound are illustrated and associated with reference numbers 162A, 162B, 162C, etc. When referring to a particular one of the frequency components, such as the frequency component 162A, the distinguishing letter "A" is used. However, when referring to any arbitrary one of these frequency components or to these frequency components as a group, the reference number 162 is used without a distinguishing letter.

Figure 1:
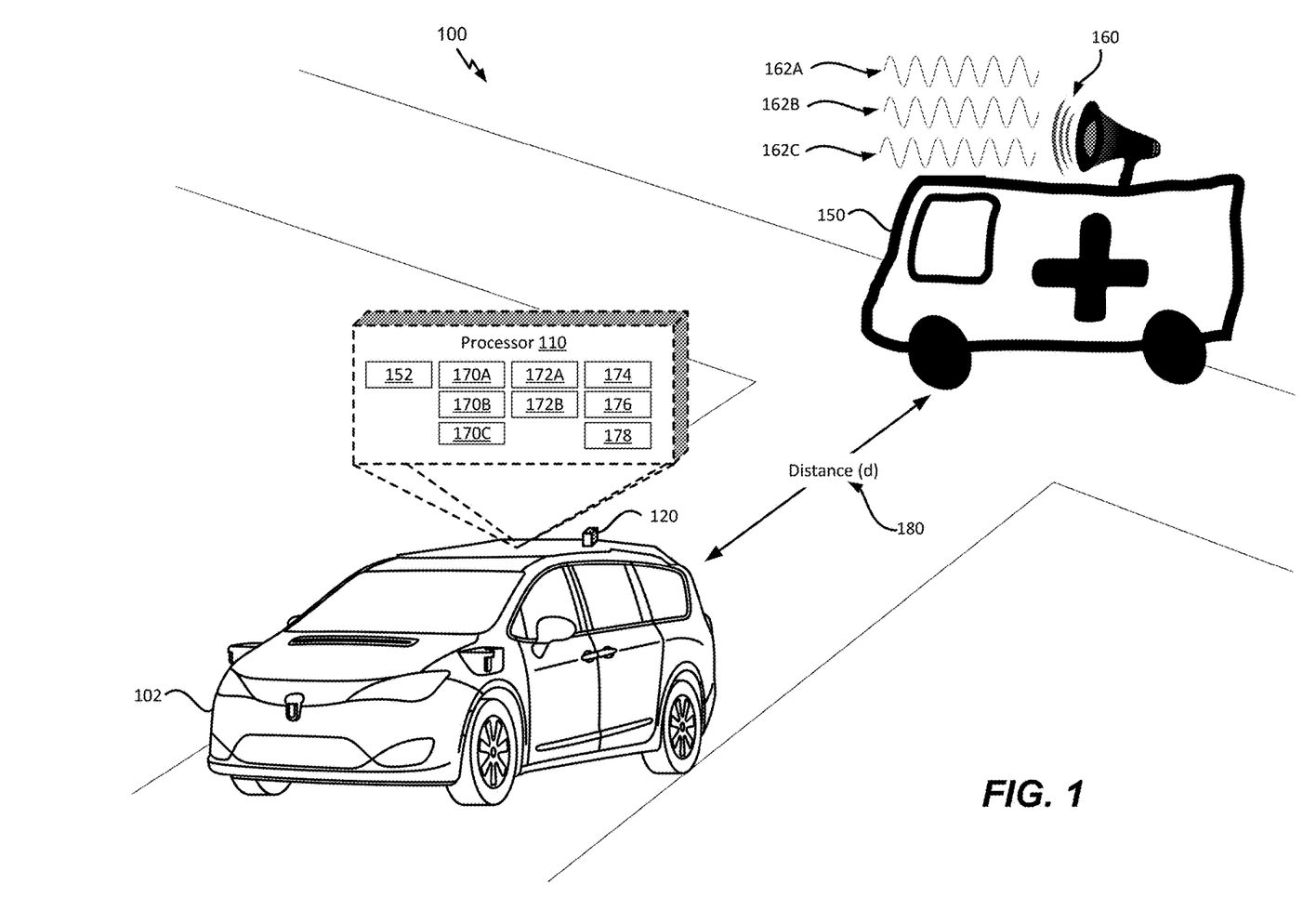
FIG. 1 is a diagram illustrating a scene in which an autonomous vehicle is proximate to a sound source, in accordance with an example embodiment.

FIG. 1 is a diagram illustrating a scene 100 in which an autonomous vehicle is proximate to a sound source, in accordance with an example embodiment. For example, as illustrated in FIG. 1, an autonomous vehicle 102 is shown proximate to a sound source 150. In particular, the autonomous vehicle 102 is a particular distance (d) 180 from the sound source 150.

As described herein, the autonomous vehicle 102 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The autonomous vehicle 102 may be configured to operate fully or partially in an autonomous mode. For example, the autonomous vehicle 102 may control itself while in the autonomous mode, and may be operable to determine a current state of the autonomous vehicle 102 and its environment, determine a predicted behavior of at least one other vehicle in the environment, determine a confidence level that may correspond to a likelihood of the at least one other vehicle to perform the predicted behavior, and control the autonomous vehicle 102 based on the determined information. While in the autonomous mode, the autonomous vehicle 102 may be configured to operate without human interaction.

According to one implementation, the sound source 150 can include an emergency vehicle. For example, as illustrated in FIG. 1, the sound source 150 includes an ambulance. However, it should be understood that the techniques described herein can be implemented using different sound sources. To illustrate, according to alternative implementations, the sound source 150 can include other types of emergency vehicles. As non-limiting examples, the sound source 150 can include a police car, a firetruck, etc. In other implementations, the sound source 150 can include non-emergency vehicles, pedestrians, etc. However, for ease of illustration and description, unless otherwise indicated, as described herein, the sound source 150 corresponds to an emergency vehicle.

The sound source 150 may generate sounds 160 that are relatively rich in harmonics. For example, the sounds 160 may include a first frequency component 162A at a first frequency, a second frequency component 162B at a second frequency, a third frequency component 162C at third frequency, etc. Although three frequency components 162A-162C are illustrated in FIG. 1, in other implementations, the sounds 160 can include additional (or fewer) frequency components. In some implementations, the first frequency of the first frequency component 162A can be a fundamental frequency of the sounds 160 generated by the sound source 150, the second frequency of the second frequency component 162B can be a harmonic of the fundamental frequency, and the third frequency of the third frequency component 162C can be an additional harmonic of the fundamental frequency.

As illustrated in FIG. 1, the sounds 160 can correspond to siren sounds from an emergency vehicle. According to one implementation and merely for illustrative purposes, the first frequency of the first frequency component 162A can be 1000 Hertz (Hz), the second frequency of the second frequency component 162B can be 2000 Hz such that the second frequency component 162B resonates at the second harmonic of the fundamental frequency, and the third frequency of the third frequency component 162C can be 3000 Hz such that the third frequency component 162C resonates at the third harmonic of the fundamental frequency. It should be understood that the frequency values described above are merely for illustrative purposes and should not be construed as limiting. In other implementations, the first frequency of the first frequency component 162A can be a different frequency value and the other frequency components 162B, 162C can resonate at different harmonics of the first frequency or can resonate at non-harmonics of the first frequency.

Attenuation rates of the different frequency components 162A-162C may vary based on the corresponding frequencies. In particular, lower frequency components of the sounds 160 may attenuate at slower rates than higher frequency components of the sounds 160. For example, the first frequency component 162A may attenuate at a slower rate than the second frequency component 162B. Similarly, the second frequency component 162B may attenuate at a slower rate than the third frequency component 162C. As a result of the varying attenuation rates, energy level ratios between the frequency components 162A-162C may fluctuate as the sounds 160 travel through air, as illustrated in greater detail with respect to FIG. 3.

The autonomous vehicle 102 includes a processor 110 and at least one microphone 120. Although the microphone 120 is illustrated on the roof of the autonomous vehicle 102 in FIG. 1, in other implementations, the microphone 120 can be at different locations of the autonomous vehicle 102.

As described herein, the autonomous vehicle 102 is configured to determine the distance (d) 180 between the autonomous vehicle 102 and the sound source 150 based on the energy level ratios of the detected frequency components 162A-162C. For example, the microphone 120 is configured to detect the sounds 160 from the sound source 150 external to the autonomous vehicle 102. Thus, according to the illustration of FIG. 1, the microphone 120 can detect the siren sounds from the ambulance.

After the microphone detects the sounds 160, the processor 110 is configured to determine a classification of the sound source 150 based on audio properties of the detected sounds 160. As non-limiting examples, the processor 110 can compare the pitch or frequency of the sounds 160, the sound patterns of the sounds 160, other audio properties of the sounds 160, or a combination thereof, to audio properties of classified sounds in a database that is accessible to the processor 110. Based on the comparison, the processor 110 can identify the sound source 150. For example, if the determined audio properties of the sounds 160 are substantially similar to audio properties of an ambulance siren in the database, the processor 110 can classify the sound source 150 as an ambulance. According to another implementation, the processor 110 can perform a Fourier transform on a set of received sound samples (e.g., the sounds 160) to convert the received sound samples to the frequency domain. The processor 110 can perform pattern recognition algorithms on the frequency domain sound samples to classify the sounds 160 (e.g., classify the sounds 160 as a siren) and identify the sound source 150. The processor 110 is configured to generate classification data 152 that indicates the classification of the sound source 150.

The processor 110 is further configured to determine energy levels of each frequency component 162A-162C of the sounds 160 detected by the microphone 120. For example, the processor 110 may determine a first energy level 170A of the first frequency component 162A, a second energy level 170B of the second frequency component 162B, and a third energy level 170C of the third frequency component. As used herein, the "energy level" of a frequency component 162 is directly related to an amplitude of the frequency component 162. That is, a frequency component 162 having a relatively large amplitude will have a relatively large energy level, and a frequency component 162 having a relatively small amplitude will have a relatively small energy level. To determine the energy levels for each frequency component 162A-162C, the processor 110 can perform a Fourier transform on a set of received sound samples (e.g., the sounds 160) to convert the received sound samples to the frequency domain. As described above, the processor 110 can perform pattern recognition algorithms on the frequency domain sound samples to classify the sounds 160 (e.g., classify the sounds 160 as a siren) and to identify the various frequency components 162A-162C and/or harmonics. In response to identifying the frequency components 162A-162C, the processor 110 can measure the energy levels or amplitudes of each frequency component 162A-162C.

According to another implementation, the processor 110 can filter the received sounds 160 through band-pass filters to isolate each frequency component 162A-162C. Upon filtering the sounds 160, the processor 110 can measure the energy level of each isolated frequency component 162A-162C at least in part by measuring the volume or amplitude of each isolated frequency component 162A-162C.

The processor 110 is further configured to determine ratios between the different energy levels. As a non-limiting example, the processor 110 can determine a ratio 172A between the first energy level 170A of the first frequency component 162A and the second energy level 170B of the second frequency component 162B. In the scenario where the first frequency component 162A resonates at the fundamental frequency and the second frequency component 162B resonates at the second harmonic of the fundamental frequency, the processor 110 can determine the energy level ratio 172A between the first and second harmonics of the sounds 160. In a similar manner, the processor 110 can determine a ratio 172B between the first energy level 170A of the first frequency component 162A and the third energy level 170C of the third frequency component 162C. In the scenarios where the first frequency component 162A resonates at the fundamental frequency and the third frequency component 162C resonates at the third harmonic of the fundamental frequency, the processor 110 can determine the energy level ratio 172B between the first and third harmonics of the sounds 160.

The processor 110 is configured to determine the distance (d) 180 between the autonomous vehicle 102 and the sound source 150 based on the energy level ratios 172. To determine the distance (d) 180, the processor 110 is configured to access a sound source library. According to one implementation, the sound source library can be located at a remote server that is accessible to the processor 110. According to another implementation, as further described with respect to FIG. 2, the sound source library can be stored in local memory that is accessible to the processor 110. Upon accessing the sound source library, the processor 110 can use the classification data 152 to identify a particular entry, in the sound source library, that is associated with the classification of the sound source 150 (e.g., an entry associated with an ambulance siren). The particular entry can indicate an energy level ratio model 174 for different frequency components of sounds emitted from the sound source 150. For example, the energy level ratio model 174 can indicate (i) a modelled energy ratio between sound components resonating at the first frequency and sound components resonating at the second frequency when sounds are emitted from the sound source 150, (ii) a modelled energy ratio between sound components resonating at the first frequency and sound components resonating at the third frequency when sounds are emitted from the sound source 150, etc. The modelled energy ratios in the energy level ratio model 174 can be updated according to a machine-learning algorithm. For example, each time an emergency vehicle passes the autonomous vehicle 102, the energy level ratio model 174 for the emergency vehicle can be updated such that the modelled energy ratios accurately reflect sounds emitted from the sound source 150.

The processor 110 can also determine atmospheric characteristics 176 associated with the autonomous vehicle 102, such as an ambient air temperature, an atmospheric pressure, a relative humidity, etc. Based on the atmospheric characteristics 176 and the energy level ratio model 174, the processor 110 can generate attenuation data 178 that indicates how energy level ratios between the different components of the siren sounds change as the siren sounds travel different distances. For example, the processor 110 can apply the atmospheric characteristics 176 to energy level ratio model 174 to predict how the modelled energy level ratios change over distance. Based on a comparison of the attenuation data 178 and the measured ratios 172, the processor 110 can determine the distance (d) 180 between the autonomous vehicle 102 and the sound source 150.

The processor 110 is further configured to generate a command to maneuver the autonomous vehicle 102 in response to a determination that the distance (d) 180 fails to satisfy a threshold distance. As a non-limiting example, if the processor 110 determines that the distance (d) 180 is less than fifty (50) meters (e.g., the ambulance is relatively close), the processor 110 may generate a command to steer the autonomous vehicle 102 to a shoulder of the road, a command to stop the autonomous vehicle 102, or both.

The techniques described with respect to FIG. 1 can improve distance estimation reliability between the autonomous vehicle 102 and the sound source 150. By estimating the distance (d) 180 based on energy level ratios 172 of different harmonics of the detected sounds 160, as opposed to based solely on the amplitude of the sounds 160, factors that may otherwise cause the distance estimation to be unreliable have little impact on the reliability of the distance estimation. For example, the initial amplitude of the sounds 160 coming from the sound source 150 have little impact on the reliability of the distance estimation according to the techniques described with respect to FIG. 1. Additionally, obstacles that affect the amplitude of the sounds 160 coming from the sounds source 150 have little impact on the reliability of the distance estimation according to the techniques described with respect to FIG. 1.

Figure 2:
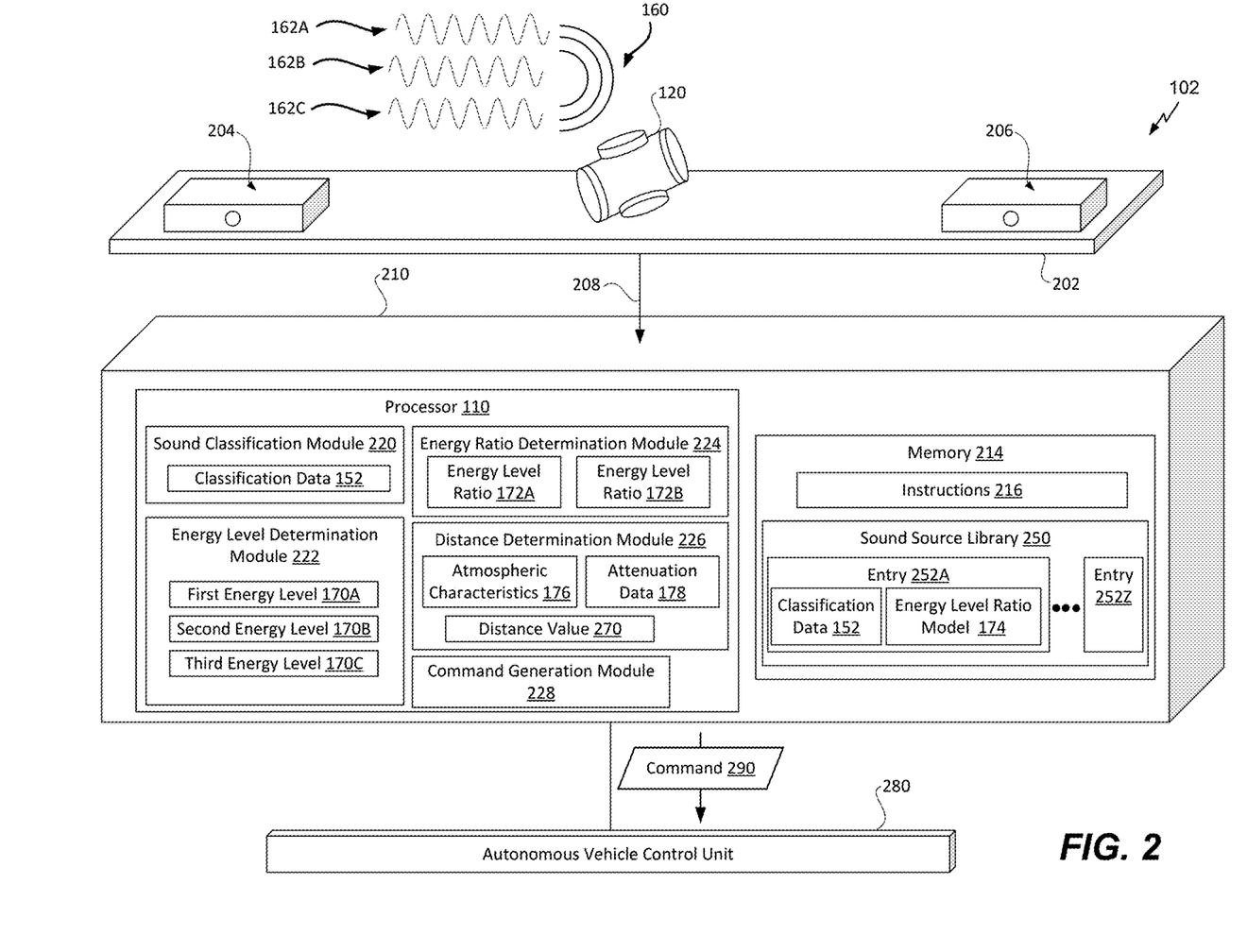
FIG. 2 is a diagram illustrating components of the autonomous vehicle, in accordance with an example embodiment.

FIG. 2 is a diagram illustrating components of the autonomous vehicle 102, in accordance with an example embodiment.

In FIG. 2, different sensors are coupled to a roof 202 of the autonomous vehicle 102. For example, the microphone 120 is coupled to the roof 202 of the autonomous vehicle 102 and two cameras 204, 206 are coupled to the roof 202 of the autonomous vehicle 102. Although the sensors are illustrated as being coupled to the roof 202, in other implementations, one or more of the sensors can be coupled to different components of the autonomous vehicle 102. Furthermore, although three sensors are illustrated in FIG. 1, in other implementations, additional (or fewer) sensors can be coupled to the autonomous vehicle 102. As a non-limiting example, in one implementation, the microphone 120 and a single camera 204 can be coupled to the roof 102 of the autonomous vehicle 102.

The microphone 120 is configured to detect the sounds 160 from the sound source 150 external to the autonomous vehicle 102. As described with respect to FIG. 1, the sounds 160 may have the first frequency component 162A at the first frequency, the second frequency component 162B at the second frequency, and the third frequency component 162C at the third frequency. It should be understood that although three frequency components 162 are illustrated, in other implementations, the sounds 160 can include additional frequency components. According to one implementation, the sounds 160 corresponds to siren sounds from an emergency vehicle, as described with respect to FIG. 1. Upon detecting the sounds 160, the microphone 120 is configured to generate audio frames 208 based on the detected (e.g., captured) sounds 160 and send the audio frames 208 to a computing system 210.

The computing system 210 includes the processor 110 that is coupled to a memory 214. The memory 214 can be a non-transitory computer-readable medium that stores instructions 216 that are executable by the processor 110. The processor 110 includes a sound classification module 220, an energy level determination module 222, an energy ratio determination module 224, a distance determination module 226, and a command generation module 228. According to some implementations, one or more of the modules 220, 222, 224, 226, 228 can correspond to software (e.g., instructions 216) executable by the processor 110. According to other implementations, one or more of the modules 220, 222, 224, 226, 228 can correspond to dedicated circuitry (e.g., application-specific integrated circuits (ASICs) or field programmable gate arrays (FPGAs)) integrated into the processor 110.

The sound classification module 220 is configured to determine the classification of the sound source 150 based on audio properties of the sounds 160. As non-limiting examples, based on the audio frames 208, the sound classification module 220 can compare the pitch or frequency of the sounds 160, the sound patterns of the sounds 160, other audio properties of the sounds 160, or a combination thereof, to audio properties of classified sounds in a database that is accessible to the sound classification module 220. Based on the comparison, the sound classification module 220 can identify the sound source 150. For example, if the determined audio properties of the sounds 160 are substantially similar to audio properties of an ambulance siren in the database, the sound classification module 220 can classify the sound source 150 as an ambulance.

According to another implementation, the sound classification module 220 can perform a Fourier transform on the audio frames 208 to convert the audio frames 208 to the frequency domain. The processor 110 can perform pattern recognition algorithms on the frequency domain audio frames 208 to classify the sounds 160 (e.g., classify the sounds 160 as a siren) and identify the sound source 150. The sound classification module 220 is configured to generate the classification data 152 that indicates the classification of the sound source 150.

The energy level determination module 222 is configured to determine the energy levels 170 of each frequency component 162 of the sounds 160 detected by the microphone 120. For example, the energy level determination module 222 may determine the first energy level 170A of the first frequency component 162A, the second energy level 170B of the second frequency component 162B, and the third energy level 170C of the third frequency component. To determine the energy levels for each frequency component 162A-162C, the energy level determination module 222 can perform a Fourier transform on the audio frames 208 to convert the audio frames 228 to the frequency domain and to identify the various frequency components 162A-162C and/or harmonics. In response to identifying the frequency components 162A-162C, the energy level determination module 222 can measure the energy levels (e.g., the volume or amplitude) of each frequency component 162A-162C.

The energy ratio determination module 224 is configured to determine the energy level ratios 172 between the different energy levels 170. As a non-limiting example, the energy ratio determination module 224 can determine the energy level ratio 172A between the first energy level 170A of the first frequency component 162A and the second energy level 170B of the second frequency component 162B. In a similar manner, the energy ratio determination module 224 can determine the energy level ratio 172B between the first energy level 170A of the first frequency component 162A and the third energy level 170C of the third frequency component 162C. In some scenarios, the first frequency component 162A resonates at a fundamental frequency, the second frequency component 162B resonates at the second harmonic of the fundamental frequency, and the third frequency component 162C resonates at the third harmonic of the fundamental frequency. In these scenarios, the energy level ratio 172A indicates the energy level ratio between the first and second harmonics of the sounds 160, and the energy level ratio 172B indicates the energy level ratio between the first and third harmonics of the sounds 160. It should be understood that the energy ratio determination module 224 can determine energy level ratios for different frequencies and different harmonics of the sounds 160.

The distance determination module 226 is configured to determine the distance (d) 180 between the autonomous vehicle 102 and the sound source 150 based on the energy level ratios 172. To determine the distance (d) 180, the distance determination module 226 is configured to access a sound source library 250 that has a plurality of entries 252A-252Z corresponding to different sound sources. Upon accessing the sound source library 250, the distance determination module 226 can use the classification data 152 to identify a particular entry 252A, in the sound source library 250, that is associated with the sound source 150 (e.g., an entry associated with an ambulance siren). The particular entry 252A can indicate the energy level ratio model 174 for different frequency components of sounds emitted from the sound source 150. For example, the energy level ratio model 174 can indicate (i) a modelled energy ratio between sound components resonating at the first frequency and sound components resonating at the second frequency when sounds are emitted from the sound source 150, (ii) a modelled energy ratio between sound components resonating at the first frequency and sound components resonating at the third frequency when sounds are emitted from the sound source 150, etc.

The distance determination module 226 is configured to determine the atmospheric characteristics 176 associated with the autonomous vehicle 102, such as an ambient air temperature, an atmospheric pressure, a relative humidity, etc. Based on the atmospheric characteristics 176 and the energy level ratio model 174, the distance determination module 226 is configured to generate the attenuation data 178 that indicates how energy level ratios between the different components of the siren sounds change as the siren sounds travel different distances. For example, the distance determination module 226 can apply the atmospheric characteristics 176 to energy level ratio model 174 to predict how the energy level ratios of the modelled frequency components change over distance. Based on a comparison of the attenuation data 178 and the measured ratios 172, the distance determination module 226 can determine a distance value 270 that is indicative of the distance (d) 180 between the autonomous vehicle 102 and the sound source 150.

The command generation module 228 is configured to generate a command 290 to maneuver the autonomous vehicle 102 based on the distance value 270. As a non-limiting example, if the command generation module 228 determines that the distance (d) 180 is less than twenty (20) meters, the command generation module 228 may generate a command 290 to steer the autonomous vehicle 102 to a shoulder of the road, a command to stop the autonomous vehicle 102, or both.

The command generation module 228 can send the command 290 to an autonomous vehicle control unit 280. The autonomous vehicle control unit 280 can be coupled to control different components of the autonomous vehicle 102, such as the steering wheel, the brakes, the accelerator, the turn signals, etc. Based on the command 290, the autonomous vehicle control unit 280 can send a signal to the different components of the autonomous vehicle 102. For example, the autonomous vehicle control unit 280 can send a signal to enable the steering wheel to maneuver the autonomous vehicle 102 to the side of the road, the autonomous vehicle control unit 280 can send a signal to enable the brakes to reduce the speed (or stop) the autonomous vehicle 102, etc.

According to one implementation, the command generation module 228 can generate a command 290 to change a mode of the autonomous vehicle 102 into a user assist mode in response to determining the distance value 270. In this implementation, in response to receiving the command 290, the autonomous vehicle control unit 280 can send signals to components of the autonomous vehicle 102 to disable an autonomous mode of operation so that a driver can control operation of the autonomous vehicle 102.

In some scenarios, the processor 110 can build and update the sound source library 250 and the energy level ratio model 174 based on (i) images captured from one or more of the cameras 204, 206 and (ii) sounds captured by the microphone 120. As a non-limiting example, the camera 204 can capture images of the sound source 150 as the sound source 150 passes the autonomous vehicle 102 (e.g., as the distance between the autonomous vehicle 102 and the sound source 150 is relatively small). At the point of image capture, the processor 110 can determine the energy level ratios of different frequency components of the sounds 160 and use these energy level ratios to build or update the energy level ratio model 174.

The techniques described with respect to FIG. 2 can improve distance estimation reliability between the autonomous vehicle 102 and the sound source 150. By estimating the distance value 270 based on energy level ratios 172 of the different harmonics, as opposed to based solely on the amplitude of the sound 160, factors that may otherwise cause the distance estimation to be unreliable have little impact on the reliability of the distance estimation. For example, the initial amplitude of the sounds 160 coming from the sound source 150 have little impact on the reliability of the distance estimation according to the techniques described with respect to FIG. 2. Additionally, obstacles that affect the amplitude of the sounds 160 coming from the sounds source 150 have little impact on the reliability of the distance estimation according to the techniques described with respect to FIG. 2.

Figure 3:
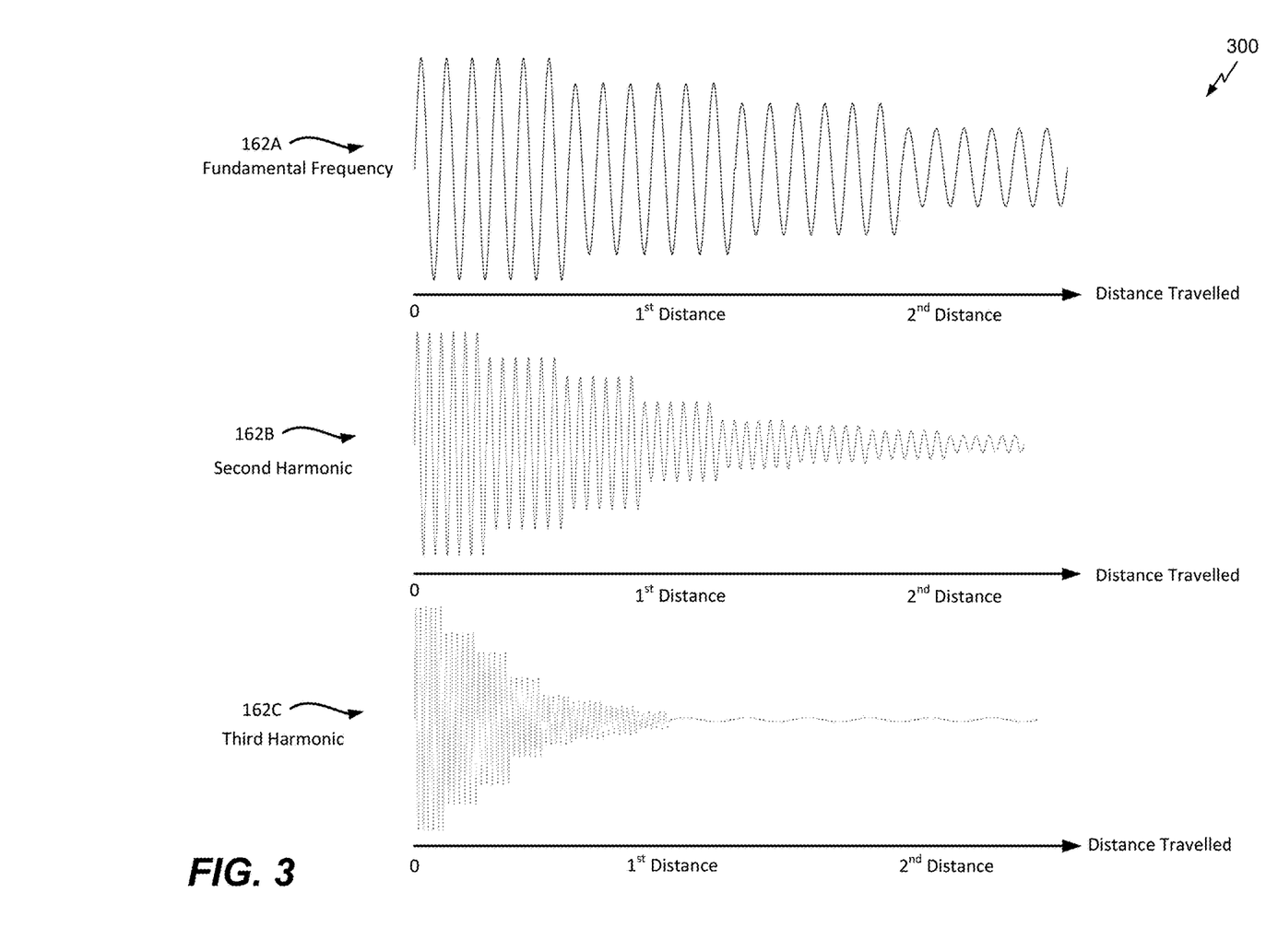
FIG. 3 is a diagram illustrating energy level attenuation for different frequency components of sounds over a travelled distance, in accordance with an example embodiment.

FIG. 3 is a diagram 300 illustrating energy level attenuation for different frequency components of sounds over a travelled distance, in accordance with an example embodiment. For example, FIG. 3 illustrates non-limiting examples of the energy levels of the frequency components 162 attenuating at different rates as the sounds travel.

As illustrated in FIG. 3, the first frequency component 162A, the second frequency component 162B, and the third frequency component 162C may have similar energy level when the sounds 160 are output by the sound source 150 (e.g., when the distance travelled is equal to "0"). In this scenario, the energy level ratio 172A between the first energy level 170A of the first frequency component 162A and the second energy level 170B of the second frequency component 162B is approximately equal to one ("1"). Additionally, the energy level ratio 172B between the first energy level 170A of the first frequency component 162A and the third energy level 170C of the third frequency component 162C is approximately equal to one ("1"). Thus, in this scenario, the distance (d) 180 between the autonomous vehicle 102 and the sound source 150 is relatively small (e.g., approximately zero) if the microphone captures the sounds 160 when energy level ratios 172A, 172B are approximately equal to one ("1").

The energy level ratio 172A between the first energy level 170A of the first frequency component 162A and the second energy level 170B of the second frequency component 162B is approximately equal to one-half ("½") at the "first distance." That is, when the frequency components 162A, 162B travel the first distance, the amplitude of the second frequency component 162B is approximately half the amplitude of the first frequency component 162A. In this scenario, the distance (d) 180 between the autonomous vehicle 102 and the sound source 150 is approximately equal to the "first distance" if the microphone 120 captures the sounds 160 when the energy level ratio 172A is approximately equal to one-half.

The energy level ratio 172A between the first energy level 170A of the first frequency component 162A and the second energy level 170B of the second frequency component 162B is approximately equal to one-third ("⅓") at the "second distance." That is, when the frequency components 162A, 162B travel the first distance, the amplitude of the second frequency component 162B is approximately one-third the amplitude of the first frequency component 162A. In this scenario, the distance (d) 180 between the autonomous vehicle 102 and the sound source 150 is approximately equal to the "second distance" if the microphone 120 captures the sounds 160 when the energy level ratio 172A is approximately equal to one-third.

The energy level ratio 172B between the first energy level 170A of the first frequency component 162A and the third energy level 170C of the third frequency component 162C is approximately equal to one-fourth ("¼") at the "first distance." That is, when the frequency components 162A, 162C travel the first distance, the amplitude of the third frequency component 162 is approximately one-fourth the amplitude of the first frequency component 162A. In this scenario, the distance (d) 180 between the autonomous vehicle 102 and the sound source 150 is approximately equal to the "first distance" if the microphone 120 captures the sounds 160 when the energy level ratio 172B is approximately equal to one-fourth.

The energy level ratio 172B between the first energy level 170A of the first frequency component 162A and the third energy level 170C of the third frequency component 162C is approximately equal to one-twelfth ("$^1\!/_{12}$") at the "second distance." That is, when the frequency components 162A, 162C travel the second distance, the amplitude of the third frequency component 162 is approximately one-twelfth the amplitude of the first frequency component 162A. In this scenario, the distance (d) 180 between the autonomous vehicle 102 and the sound source 150 is approximately equal to the "second distance" if the microphone 120 captures the sounds 160 when the energy level ratio 172B is approximately equal to one-twelfth.

The varying attenuations of the frequency components 162 illustrated in FIG. 3 enable the processor 110 to determine the distance (d) 180 between the autonomous vehicle 102 and the sound source 150 based on the energy level ratios 172. For example, by estimating the distance (d) 180 based on energy level ratios of the attenuating frequency components 162, as opposed to based solely on the amplitude of the frequency components 162, factors that may otherwise cause the distance estimation to be unreliable have little impact on the reliability of the distance estimation.

III. Example Methods

Figure 4:
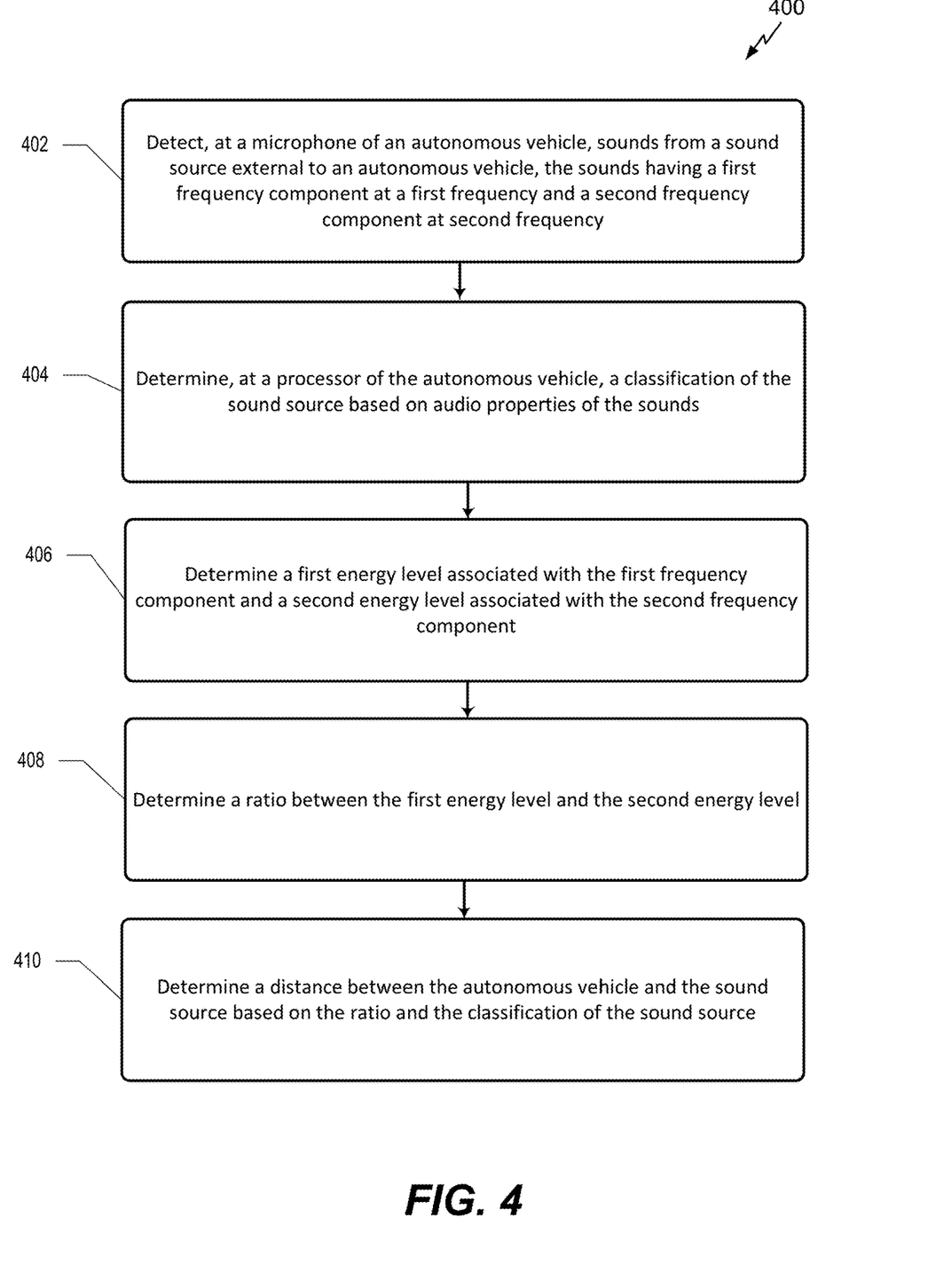
FIG. 4 is a flowchart of a method, according to an example embodiment.

FIG. 4 is a flowchart of a method 400, according to an example embodiment. The method 400 can be performed by the autonomous vehicle 102.

The method 400 includes detecting, at a microphone of an autonomous vehicle, sounds from a sound source external to an autonomous vehicle, at 402. The sounds have a first frequency component at a first frequency and a second frequency component at a second frequency. For example, referring to FIGS. 1-2, the microphone 120 detects the sounds 160 from the sound source 150 external to the autonomous vehicle 102. The sounds 160 have the first frequency component 162A at the first frequency and the second frequency component 162B at the second frequency. According to one implementation, the first frequency corresponds to a fundamental frequency and the second frequency corresponds to a harmonic of the fundamental frequency.

According to one implementation of the method 400, the sounds correspond to siren sounds and the sound source includes an emergency vehicle. According to one implementation of the method, the sounds from the sound source may have a third frequency component at a third frequency. For example, referring to FIGS. 1-2, the sounds 160 from the sound source 150 have the third frequency component 162C.

The method 400 also includes determining, at a processor of the autonomous vehicle, a classification of the sound source based on audio properties of the sounds, at 404. For example, referring to FIGS. 1-2, the sound classification module 220 determines the classification of the sound source 150 based on audio properties of the audio frames 208 generated from the detected sounds 160.

The method 400 also includes determining a first energy level associated with the first frequency component and a second energy level associated with the second frequency component, at 406. For example, referring to FIGS. 1-2, the energy level determination module 222 determines the first energy level 170A associated with the first frequency component 162A of the detected sounds 160 and the second energy level 170B associated with the second frequency component 162B of the detected sounds 160. As described herein, the second energy level 170B associated with the second frequency component 162B attenuates at a higher rate than the first energy level 170A associated with the first frequency component 162A. For example, lower frequency components (e.g., the first frequency component 162A) of the sounds 160 attenuate at slower rates than higher frequency components of the sounds 160 (e.g., the second frequency component 162B). According to one implementation, the method 400 also includes determining a third energy level associated with a third frequency component. For example, referring to FIGS. 1-2, the energy level determination module 222 may determine the third energy level 170C associated with the third frequency component 162C of the detected sounds 160 from the sound source 150.

The method 400 also includes determining a ratio between the first energy level and the second energy level, at 408. For example, referring to FIGS. 1-2, the energy ratio determination module 224 determines the energy level ratio 172A between the first energy level 170A and the second energy level 170B. According to one implementation, the method 400 also includes determining an additional ratio between the first energy level and the third energy level. For example, referring to FIGS. 1-2, the energy ratio determination module 224 may determine the energy level ratio 172B between the first energy level 170A and the third energy level 170C.

The method 400 also includes determining a distance between the autonomous vehicle and the sound source based on the ratio and the classification of the sound source, at 410. For example, referring to FIGS. 1-2, the distance determination module 226 determines the distance (d) 180 between the autonomous vehicle 102 and the sound source 150 based on the energy level ratio 172A and the classification of the sound source 150, as indicated by the classification data 152. According to one implementation, the distance (d) 180 between the autonomous vehicle 102 and the sound source 150 is further based on the additional ratio 172B between the first energy level 170A and the third energy level 170C.

According to one implementation of the method 400, determining the distance between the autonomous vehicle and the sound source includes identifying, in a sound source library, a particular entry associated with the sound source based on the classification of the sound source. The particular entry may indicate an energy level ratio model for different frequency components of sounds emitted from the sound source. Determining the distance may also include determining atmospheric characteristics associated with the autonomous vehicle. Determining the distance may further include determining, based on the energy level ratio model and the atmospheric characteristics, attenuation data that indicates how energy level ratios between the different frequency components of the sounds emitted from the sound source change as the sounds emitted from the sound source travel different distances. The distance between the autonomous vehicle and the sound source may be based on a comparison between the ratio and the attenuation data.

According to one implementation, the method 400 can also include generating a command to maneuver the autonomous vehicle in response to a determination that the distance fails to satisfy a threshold distance. For example, referring to FIGS. 1-2, the command generation module 228 generates the command 290 to maneuver the autonomous vehicle 102 in response to a determination that the distance (d) 180 fails to satisfy a threshold distance.

The method 400 can improve distance estimation reliability between the autonomous vehicle 102 and the sound source 150. By estimating the distance (d) 180 based on energy level ratios 172 of different harmonics of the detected sounds 160, as opposed to based solely on the amplitude of the sounds 160, factors that may otherwise cause the distance estimation to be unreliable have little impact on the reliability of the distance estimation. For example, the initial amplitude of the sounds 160 coming from the sound source 150 have little impact on the reliability of the distance estimation according to the techniques described with respect to FIG. 1. Additionally, obstacles that affect the amplitude of the sounds 160 coming from the sounds source 150 have little impact on the reliability of the distance estimation.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method of determining a distance between a vehicle and a sound source external to the vehicle, the method comprising:
   detecting, at a microphone of the vehicle, sounds from the sound source, the sounds having a first frequency component at a fundamental frequency and a second frequency component at a first harmonic of the fundamental frequency;
   determining, at a processor of the vehicle, a first energy level associated with the first frequency component at the fundamental frequency and a second energy level associated with the second frequency component at the first harmonic of the fundamental frequency;
   determining a ratio between the first energy level and the second energy level;
   determining atmospheric characteristics associated with the vehicle; and
   determining, based on an energy level ratio model and the atmospheric characteristics, attenuation data between the different frequency components of the sounds emitted from the sound source; and
   determining the distance between the vehicle and the sound source based on a comparison of the ratio and the attenuation data.

2. The method of claim 1, further comprising determining a classification of the sound source based on audio properties of the sounds, wherein the determination of the distance between the vehicle and the sound source is further based on the classification of the sound source.

3. The method of claim 1, wherein the sounds from the sound source have a third frequency component at a second harmonic of the fundamental frequency, and further comprising:
   determining a third energy level associated with the third frequency component; and
   determining an additional ratio between the first energy level and the third energy level, wherein the distance between the vehicle and the sound source is further based on the additional ratio between the first energy level and the third energy level.

4. The method of claim 2, wherein the classification is further determined based on a comparison of the audio properties of the sounds to audio properties of classified sounds in a database.

5. The method of claim 1, wherein the sounds correspond to siren sounds, and wherein the sound source comprises an emergency vehicle.

6. The method of claim 1, wherein the energy level ratio model indicates modeled enemy level ratios for different frequency components of sounds emitted from the sound source.

7. The method of claim 6, wherein the attenuation data indicates changes, over a distance, of energy level ratios between the different frequency components of the sounds, wherein the energy level ratio model is identified in a sound source library based on a classification of the sound source, and wherein the atmospheric characteristics comprise at least one of an ambient air temperature, an atmospheric pressure, or a relative humidity.

8. The method of claim 7, wherein the energy level ratio model in the sound source library is built and updated according to a machine-learning algorithm.

9. The method of claim 1, wherein the second energy level associated with the second frequency component at the first harmonic of the fundamental frequency attenuates at a higher rate than the first energy level associated with the first frequency component at the fundamental frequency.

10. The method of claim 1, further comprising generating a command to maneuver the vehicle in response to a determination that the distance fails to satisfy a threshold distance.

11. A system comprising:
   a microphone configured to detect sounds from a sound source external to a vehicle, the sounds having a first frequency component at a fundamental frequency and a second frequency component at a first harmonic of the fundamental frequency; and a processor coupled to the microphone, the processor configured to:
determine a first energy level associated with the first energy level associated with the first frequency component at the fundamental frequency and a second energy level associated with the second frequency component at the first harmonic of the fundamental frequency;
determine a ratio between the first energy level and the second energy level;
determine atmospheric characteristics associated with the vehicle; and
determine, based on an energy level ratio model and the atmospheric characteristics, attenuation data between the different frequency components of the sounds emitted from the sound source; and
determine a distance between the vehicle and the sound source based on a comparison of the ratio and the attenuation data.

12. The system of claim 11, further comprising determining a classification of the sound source based on audio properties of the sounds, and wherein the determination of the distance between the vehicle and the sound source is further based on the classification of the sound source.

13. The system of claim 11, wherein the sounds from the sound source have a third frequency component at a second harmonic of the fundamental frequency, and wherein the processor is further configured to:
determine a third energy level associated with the third frequency component; and
determine an additional ratio between the first energy level and the third energy level, wherein the distance between the vehicle and the sound source is further based on the additional ratio between the first energy level and the third energy level.

14. The system of claim 13, wherein the third frequency component corresponds to an additional harmonic of the fundamental frequency.

15. The system of claim 11, wherein the sounds correspond to siren sounds, and wherein the sound source comprises an emergency vehicle.

16. The system of claim 11, wherein the energy level ratio model indicates modeled energy level ratios for different frequency components of sounds emitted from the sound source.

17. The system of claim 16, wherein the attenuation data indicates changes, over a distance, of energy level ratios between the different frequency components of the sounds, wherein the energy level ratio model is identified in a sound source library based on a classification of the sound source, and wherein the atmospheric characteristics comprise at least one of an ambient air temperature, an atmospheric pressure, or a relative humidity.

18. The system of claim 17, wherein the energy level ratio model in the sound source library is built and updated according to a machine-learning algorithm.

19. A non-transitory computer-readable medium having stored therein instructions executable by a processor to cause the processor to perform functions, the functions comprising:
determining a classification of a sound source external to a vehicle based on audio properties of sounds from the sound source that are detected by a microphone, the sounds having a first frequency component at a fundamental frequency and a second frequency component at a first harmonic of the fundamental frequency;
determining a first energy level associated with the first energy level associated with the first frequency component at the fundamental frequency and a second energy level associated with the second frequency component at the first harmonic of the fundamental frequency;
determining a ratio between the first energy level and the second energy level;
determining atmospheric characteristics associated with the vehicle;
determining, based on an energy level ratio model and the atmospheric characteristics, attenuation data between the different frequency components of the sounds emitted from the sound source; and
determining a distance between the vehicle and the sound source based on the ratio and the attenuation data.

20. The non-transitory computer-readable medium of claim 19, wherein the sounds correspond to siren sounds, and wherein the sound source comprises an emergency vehicle.

* * * * *